March 3, 1931. H. H. LINN 1,794,630
CONSTRUCTION FOR AUTOMOBILE TRAILERS AND THE LIKE
Filed Aug. 20, 1928 3 Sheets-Sheet 1

Holman H. Linn
INVENTOR
BY Robert S Blair
ATTORNEY

March 3, 1931. H. H. LINN 1,794,630
CONSTRUCTION FOR AUTOMOBILE TRAILERS AND THE LIKE
Filed Aug. 20, 1928  3 Sheets-Sheet 2

Holman H. Linn
INVENTOR
BY Robert S. Blair
ATTORNEY

March 3, 1931. H. H. LINN 1,794,630
CONSTRUCTION FOR AUTOMOBILE TRAILERS AND THE LIKE
Filed Aug. 20, 1928 3 Sheets-Sheet 3

Holman H. Linn
INVENTOR
BY Robert I. Blair
ATTORNEY

Patented Mar. 3, 1931

1,794,630

UNITED STATES PATENT OFFICE

HOLMAN H. LINN, OF MORRIS, NEW YORK, ASSIGNOR TO LINN TRAILER CORPORATION, OF ONEONTA, NEW YORK, A CORPORATION OF NEW YORK

CONSTRUCTION FOR AUTOMOBILE TRAILERS AND THE LIKE

Application filed August 20, 1928. Serial No. 300,778.

This invention relates to vehicle construction and more particularly to construction for automobile trailers and the like. One of the objects of this invention is to provide a construction of the above-mentioned character that will be simple, thoroughly practical, inexpensive and rugged. Another object is to provide a construction for a trailer adapted to be secured to a self-propelled vehicle, such as an automobile or trailer, for example, that will be capable of being readily attached to or detached from the vehicle, capable of being easily and conveniently manipulated or handled, either when detached from or when attached to the self-propelled vehicle, and capable of being readily and dependably adjusted to meet the varying characteristics of automobile and tractor constructions. Another object is to provide a trailer construction of the above-mentioned character adapted in a thoroughly dependable manner to co-act with the driving wheels of the self-propelled vehicle both by way of increasing the tractive effort thereof and by way of increasing the braking action thereof. Another object is to provide a trailer construction that may be dependably and with safety used either at the rear or front of an automobile or tractor. Another object is to provide a trailer construction of the above-mentioned character having preferably a single load-carrying wheel and in which construction such objects as those noted above are carried out. Another object is to provide a trailer construction and body therefor well adapted to meet the varying conditions of hard practical use. Other objects will be in part obvious or in part pointed out hereinafter.

The invention accordingly consists in the features of construction, combinations of elements, and arrangements of parts as will be exemplified in the structure to be hereinafter described and the scope of the application of which will be indicated in the following claims.

In the accompanying drawings in which is shown one of various possible embodiments of my invention.

Similar reference characters refer to similar parts throughout the several views of the drawings.

Figure 1:
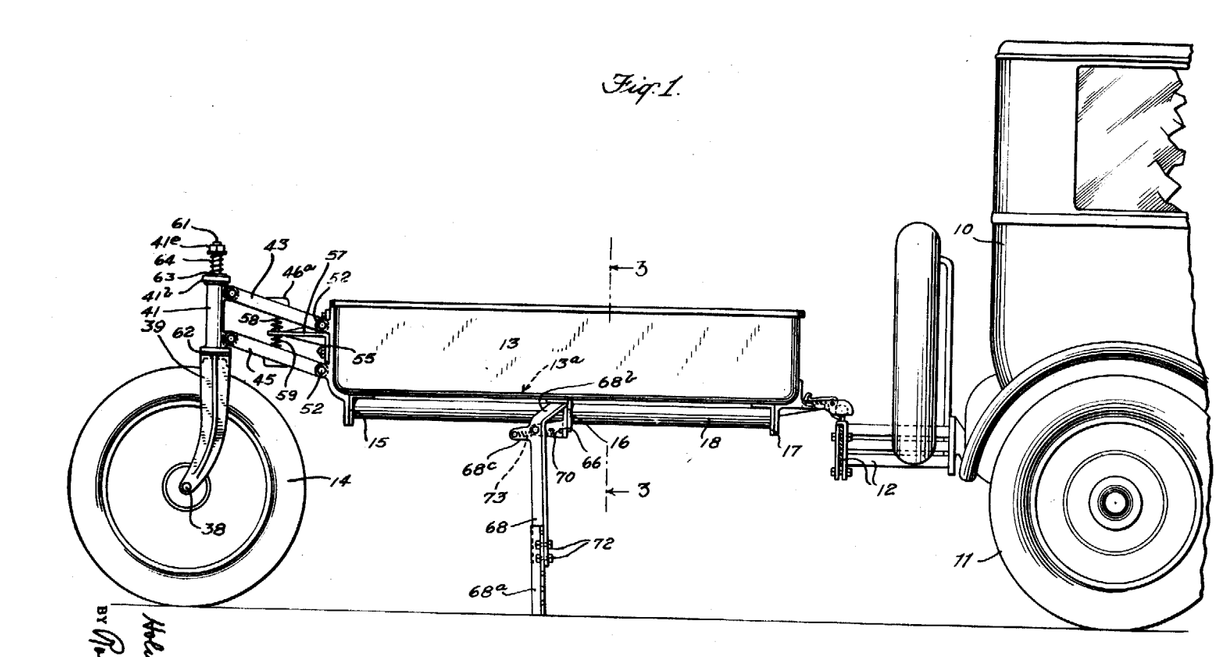
Figure 1 is a side elevation of a trailer shown in assembled relation with respect to an automobile.

Referring now to the drawings, and more particularly to Figure 1, there is shown at 10 the rear portion of an automobile but it is to be understood that any other suitable vehicle preferably self-propelled may be used, though certain features of my invention are of peculiar advantage in connection with automobiles and tractors.

The automobile 10 has the usual rear or traction wheels 11 and suitably secured to and extending preferably across its rear is a bumper generally indicated at 12. The bumper may be of any suitable construction and may, for example, comprise a plurality of relatively yieldable bars adapted to yieldably assume or absorb the effect of collisions and the like. In Figure 1 the bumper 12 is shown as embodying three such yieldable bars and in Figure 2 the bumper 12 is shown as extending across the entire rear end of the car body, though it is to be understood that the bumper may, as is sometimes the case in practice, be made up of a number of sections.

Figure 2:
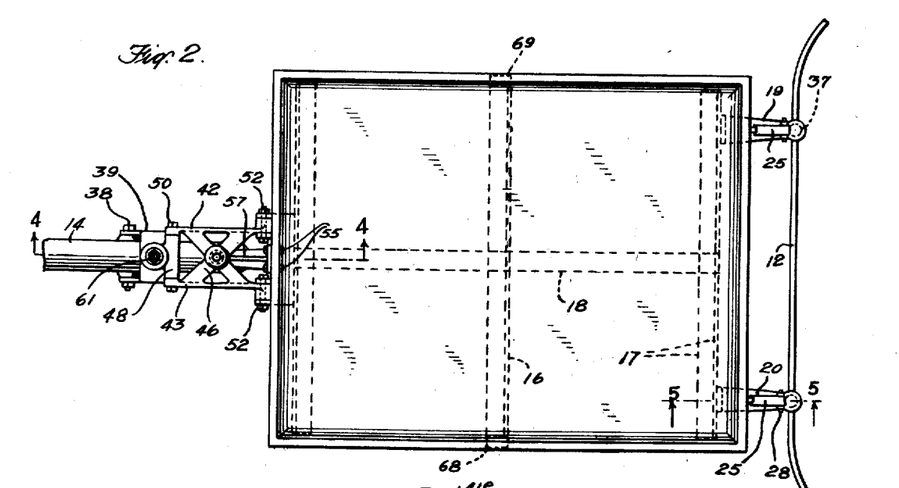
Figure 2 is a plan view, as seen from the top of Figure 1.

It is also to be understood that the vehicle may be provided with bumpers at the forward end thereof and that the front bumper thus provided may be of a construction substantially similar to that above described; the bumper 12, as illustrated in Figure 2, in which the vehicle itself is purposely omitted, is to be understood as representing a bumper either at the front or rear of the automobile.

Attached to the rear of the automobile 10 and preferably to the bumper 12 thereof is a trailer comprising a body 13 and preferably a single wheel 14. The attachment of the latter to the body 13 and of the body 13 to the automobile will be described in greater detail hereinafter.

Figure 3:
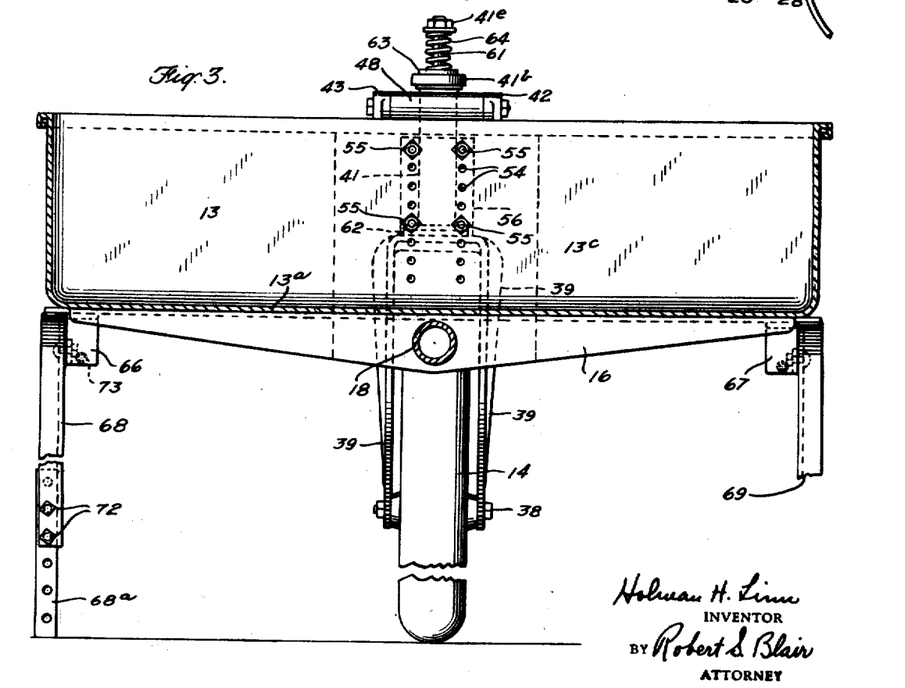
Figure 3 is a vertical sectional view on an enlarged scale, as seen along the line 3—3 of Figure 1.

The body 13 is preferably made of sheet metal and may be of any suitable shape or form. Illustratively and preferably the body 13, as will be clear from Figures 1, 2 and 3, is substantially rectangular or box-like in shape and may be of any convenient or suitable depth.

The body 13 has extending transversely thereof and preferably on the underside of the bottom, a plurality of cross-beams, shown in Figures 1 and 2 as three in number and made up preferably of the angle irons 15, 16 and 17. The angle irons 15 and 17 are at the respective ends of the body 13 and their angles will be seen in Figure 1 to face toward each other. The cross-beam or angle iron 16 extends crosswise substantially intermediate of the members 15 and 17. Each of these angle irons is secured to the body 13 in any suitable manner, preferably by riveting thereto or welding. If desired the cross-beams may have their vertical extending web shaped substantially as is better shown in Figure 3, it being noted that the web is of progressively greater depth as the center line of the body 13 is approached.

Extending lengthwise and centrally of the body 13 and underneath the bottom member 13a thereof is a tubular frame member 18, preferably of steel and passing through a suitable opening in the vertical web of the central cross-beam 16 and abutting at its ends against the vertical webs of the cross-beams 15 and 17. The member 18 is rigidly secured, preferably as by welding, to each of the cross-beams 15, 16 and 17, and thus acts dependably to resist any tendency to throw the cross-beams out of parallelism with one another.

Figure 5:
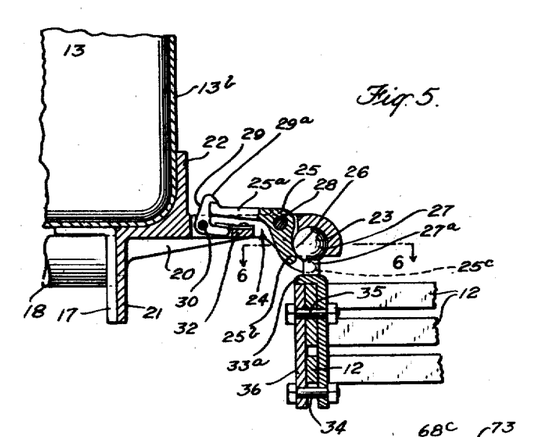
Figure 5 is a vertical sectional view on an enlarged scale, as seen along the line 5—5 of Figure 2.

At the right-hand end of the body 13, as seen in Figures 1 and 2, and spaced laterally from one another, there are secured two brackets 19 and 20 (see Figure 2), both of substantially identical construction and hence the details of only one need be described. In Figure 5 the bracket 20 is shown in vertical cross-section on an enlarged scale.

Turning now to Figure 5, it will be seen that the bracket 20 is provided with a downwardly extending flange 21 adapted to seat against the web of the cross-beam 17, the member 21 being secured thereto in any suitable manner, preferably as by welding. Another portion 22 of the bracket 20 extends upwardly and rests against the right-hand end wall 13b of the body 13, the member 22 being suitably curved to form a seat in which the curved portion of the body is received; the parts 22 and 13b are secured together in any suitable manner, preferably as by welding.

Figure 6:
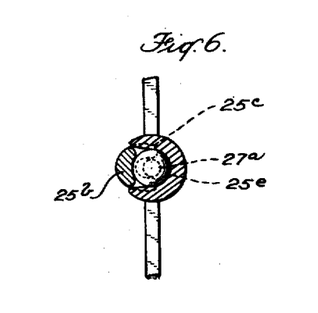
Figure 6 is a horizontal sectional view, as seen along the line 6—6 of Figure 5.

The extreme right-hand portion of the bracket 20 is hollowed out on its underside and given a spherical surface, as indicated at 23 in Figure 5, the surface 23 being of an extent preferably greater than hemispherical. The arm or bracket 20 is cut away at its central portion adjacent the extreme right-hand end, as is indicated at 24, and pivoted in the recess 24 thus formed is a member 25 having the general shape of a bell crank lever, one arm 25a of which extends toward the body 13 and the other arm 25b of which extends downwardly through the recess 24, being bifurcated or forked as shown at 25c and 25c in Figure 6. The portions 25b, 25c and 25e are shaped to present a curved or spherical surface indicated at 26 which, when the member 25 is in the position shown in Figure 5, forms a complement of the spherical surface 23 of the arm 20 and with the latter forms a socket within which a ball 27, to be more clearly described hereinafter, is received and held.

The member 25 is pivoted upon a pin 28 which extends through the two side portions of the arm 20 on each side of the recess 24 and is held in the position shown in Figure 5 by means of a latch generally indicated at 29. The latch 29 is conveniently in the form of a bell crank lever pivoted in the recess 24 upon the pin 30 which is supported by the two side portions of the arm 20. A spring 31 conveniently in the form of a leaf spring and suitably mounted upon a rigid portion 32 of the arm 20 engages one arm of the bell crank lever 29 and tends to swing the latter in clockwise direction, as seen in Figure 5. The other arm of the member 29 is shaped as at 29a to overlap and lock the arm 25a of member 25 when the latter is moved into the position shown in Figure 5, the spring 31 acting to prevent accidental disengagement of the portion 29a from the arm 25a of member 25.

The ball 27 is integrally formed with the member 33, the latter being preferably of plate-like construction and of sufficient vertical expanse to rest against and overlap the inner or right-hand faces of the spring members that make up the bumper 12 and it is secured to the latter, as by clamping bolts 34 and 35, and a clamping plate 36 which rests against the outer or left-hand faces of the members of the bumper 12.

The plate-like member 33 is provided with an upper horizontally extending portion 33a adapted to overlap the upper edge of the uppermost member of the bumper 12, as well as the upper edge of the clamping plate 36; the ball 27 is carried by the portion 33a, being connected thereto by a substantially cylindrical shank portion 27a.

It will be understood that the bracket or arm 19 (Figure 2) is of similar construction to the arm 20 above-described in detail and that it coacts with a similar ball member secured or clamped to the bumper 12 by a construction generally indicated in Figure 2 at 37, the construction of which is substantially similar to that above-described in detail in connection with the ball member 27.

The members 33 and 36 by which the ball member 27 is secured to the bumper 12 may be secured in any desired position lengthwise of the bumper 12, the bolts 34 and 35 passing in between or beneath the members that make up the bumper 12, as is clearly shown in Figure 5, and a loosening up of the clamping bolts permitting sliding of the clamping plates 33 and 36 and with them the ball 27 along the bumper 12. Thus, the ball members 27 may be quickly and dependably positioned or spaced along the bumper 12 to suit the spacing of the brackets 19 and 20 on the trailer body 13.

Moreover, the load transmitted to the ball 27 by the brackets is in turn directly transmitted by the overhanging portion 13a to the upper edge of the bumper construction, the clamping plates 33 and 36 making sure that the remaining members of the bumper 12 take part in carrying the load. The bumper 12, moreover, is secured to the chassis of the automobile 10, suitable springs being, as is usual, interposed between the car body and the wheels or wheel axles. Whatever load in the trailer body 13 that is transmitted by the arms or brackets 19 and 20 to the bumper 12 is thus transmitted through the usual spring construction directly to the axles and wheels of the automobile or tractor. Moreover, the tractive effort exerted by the self-propelled vehicle in pulling or pushing the trailer is transmitted through the yielding bumper construction 12 and thus I achieve further advantages, some of which are pointed out in detail hereinafter.

Figure 4:
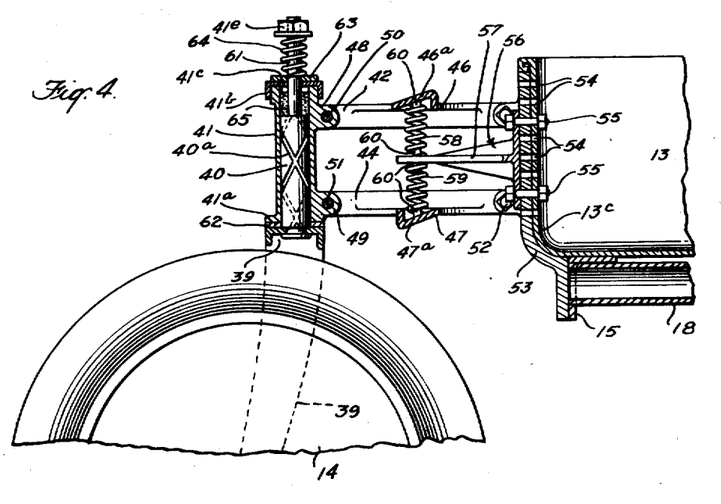
Figure 4 is a vertical sectional view on an enlarged scale, as seen along the line 4—4 of Figure 2.

Referring now more particularly to Figures 1 and 4, the left-hand end of the trailer body 13 is supported preferably by a single wheel 14 which may be and preferably is rubber-tired like an automobile wheel; the wheel 14 is carried in suitable bearings on a stud shaft 38 extending through the lower ends of the two arms of a fork or trunnion 39, the upper end of which, turning now to Figure 4, is provided with a post 40 rotatably supported in a substantially vertically extending sleeve-like housing 41. The housing 41 is connected to the trailer body 13 by two vertically displaced parallel series of links 42—43 and 44—45 (see also Figure 2). The upper pair of links 42—43 are horizontally displaced and are cross-braced by an X-shaped member 46, with which they are preferably integrally formed. The lower pair of links 44—45 are similarly displaced horizontally and are cross-braced by an X-shaped member 47 (see Figure 4) with which they also are preferably integrally formed.

The housing 41 is provided with transversely extending and vertically displaced bearing members 48 and 49 (Figure 4), the latter being of sufficient extent to be snugly received between the members 42—43 and the members 44—45 respectively, the housing 41 being pivoted to the links by suitable bolts or stud shafts 50 and 51 which pass through the coacting bearing members and link members.

The right-hand ends of the links 42—43 and 44—45 are pivotally connected as by bolts 52 to suitable ears preferably integrally formed on a plate member 53 which rests flatwise against the outer face of the end wall 13c of the trailer body 13 and is extended downwardly and inwardly to rest flatwise against the vertical web of the angle iron cross-beam 15, all as is clearly shown in Figure 4. The plate member 53 is secured to the body 13 in any suitable manner, preferably as by welding to the end wall 13c and to the cross-beam 15.

The plate 53 and the end wall 13c are provided with a vertically extending series of suitably spaced registering openings 54 through which are adapted to extend clamping bolts 55 for securing to the plate 53 and to the body 13 a bracket generally indicated at 56 and having a horizontally extending arm 57, the latter terminating substantially in line with the centers of the X-shaped cross-braces 46 and 47 of the parallel link members.

Interposed between the arm 57 and the upper and lower link members are two springs 58 and 59. Preferably the X-shaped portions of the link members are provided with seats, as indicated at 46a and 47a in Figure 4, within which the ends of the two springs are respectively seated, suitable pins 60 being preferably provided in these seats, as well as on the arm 57, for dependably holding the springs 58 and 59 against displacement in a horizontal direction.

Considering now more particularly the manner of mounting the fork or trunnion 39 in the housing 41, and referring to Figure 4, it will be noted that the post 40 is received within the housing 41 and has an upwardly extending stud 61 preferably formed integrally therewith, the post 40 being preferably of less extent vertically than the housing 41. The lower end of the housing 41 is provided with a flange 41a of suitable extent to provide at its under side an appropriate area or surface against which rests a washer 62 made of a suitable material like fiber, for example, and having good wearing qualities. The fiber washer 62 is thus interposed between the upper portion of the yoke or trunnion 39 and the under surface of the flange 41a.

The stud 61 extends upwardly through an end cap 41b preferably detachably secured to the housing 41 and provided with an opening 41c connecting with the space above the post 40. The upper end of the stud 41 is threaded and carries a nut 41e between which and a washer 63 which rests upon the end cap 41b, there is interposed a spring 64. The spring 64 acts in a direction to tend to compress the fiber washer 62 between the fork 39 and the flange 41a and by means of the nut 41e the extent of this compressing action may be adjusted at will.

The space above the post 40 is filled with a suitable lubricant such as a heavy oil indicated at 65, the opening 41c permitting access thereto and preferably the post 40 is provided with oil grooves 40a.

Referring now to Figures 3 and 1, there are secured to the central cross-beam 16 and preferably near the ends thereof, two brackets generally indicated at 66 and 67. Each bracket 66 and 67 has secured thereto legs 68 and 69 adapted to support the body 13 when the latter is detached from the vehicle 10, and since the mountings of both legs to their respective brackets are preferably identical it will suffice to describe in detail the mounting of one leg.

Figure 7:
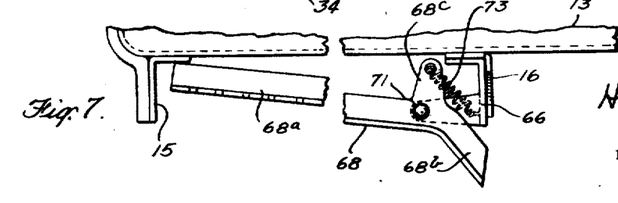
Figure 7 is a fragmentary side elevational view on an enlarged scale showing certain parts of the construction in one of the various positions which they may assume.

In Figures 1 and 7 is shown the mounting of the leg 68, and it will be noted that the bracket 66 has a portion which rests flatwise against the cross-beam 16 and is thereto secured as by riveting or welding, for example; the bracket 66 also has a horizontally extending arm 70 to which the leg 68 is pivoted as at 71.

The leg 68 is preferably made of angle iron and is constructed to be adjustable in length. For example, it may have a lower portion 68a, also of angular cross-section and fitted within the angle of the main portion 68 and clamped to the latter as by the bolts 72, suitable openings being provided in the registering flanges of the members 68 and 68a to permit the over-all length of these two members to be predetermined or adjusted at will, all for a purpose to be more clearly described hereinafter.

The upper end of the leg 68 is bent at a suitable angle, as indicated at 68b (Figures 1 and 7), the bent portion 68b being thus adapted to abut against the horizontal web or flange of the cross-brace 16, as is better shown in Figure 1, when the leg 68 is in downward position to support the body 13.

An arm 68c projects horizontally from the leg 68, as seen in Figure 1, and may be integrally formed therewith or secured thereto in any suitable manner. A spring 73 has its respective ends secured to the outer end of the arm 68c and to the bracket 66, as is better shown in Figure 7, the parts being related so that when the leg 68 is in body-supporting position, as shown in Figure 1, the spring 73 acts to hold the leg 68 with the portion 68b thereof abutting against the cross-brace 16, the spring 73 in this position of these parts acting along a line below the pivot point 71 of the leg 68. This is clearly shown in Figure 1.

Should the leg 68 (and similarly its coacting leg 69) be swung in clockwise direction about the pivot 71, either manually or due to the movement of the vehicles in a direction toward the right, as seen in Figure 1, the spring arm 68c is swung about the pivot 71 so that the spring 73 thus acts along a line that is now on the other side of the axis of the member 68, whence the spring, in contracting, swings the leg 68 into and holds it in the position shown in Figure 7, from which it will be seen that the leg is dependably carried and held in inoperative position and snugly disposed underneath the trailer body 13.

The springs 73 will thus be seen to act dependably to hold the legs 68 and 69 in either of the positions into which they may be swung.

Considering now briefly the action of the apparatus above described, it might first be noted that the brackets 19 and 20 (Figure 2) form convenient handles for manually manipulating or moving about the trailer construction, while the legs 68 and 69 are readily swung into the position shown in Figures 1 and 3 to hold or support the right-hand end of the trailer body, as seen in Figure 1. These legs 68 and 69 are preferably positioned very close to the longitudinal center of the body 13, so that in case it is desired to attach a loaded trailer 13 to the automobile or tractor, the trailer with its load may be easily tilted about the legs 68 and 69 to carry the brackets 19 and 20 downwardly and into coacting relation to the respective ball members 27, it being understood that the legs 68 and 69 are preferably adjusted to such a length that normally the brackets 19 and 20 extend somewhat higher than do the two ball members attached to the bumper 12.

The latches 29 on the brackets 19 and 20 having been swung against the action of the spring 31 (see Figure 5) thus to release the forked members 25 and the latter having been swung in clockwise direction about their pivots 28 so as in effect to open the under side of the hollow spherical end portions of the two brackets, the trailer is then swung in clockwise direction about the legs 68 and 69 (as viewed in Figure 1) whereupon the brackets 19 and 20 are carried downwardly and over the two spaced ball members 27 carried by the bumper 12. The ball members having thus been brought into contact with the spherical surface 23 (see Figure 5) of the respective brackets, the forked members 25 are swung in counter-clockwise direction and the arms 25a thereof snapped under the latches 29.

The action of the forked portions 25b, 25c and 25e (see also Figure 6) dependably locks each ball member 27 to its respective bracket in that these portions so encompass the ball members 27 as to prevent movement thereof out of the respective arms 19 and 20 though permitting a wide range of universal movement angularly between the vehicle 10 and the trailer.

Referring now to Figures 1 and 4, it will be noted that the fork or trunnion 39 is shaped so that the axis 38 of the wheel 14 is laterally displaced from the substantially vertical axis of the post 40 so that the wheel 14 tends to follow whatever movements are transmitted to the housing 41 by the body 13, the post 40 and fork 39 being rotatable to permit this action to take place. Part of the load on the body 13 is transmitted to the housing 41 and hence to the wheel 14 through the spring 59 so that the body 13 and its load is spring-supported and so that the wheel 14 can accommodate itself to irregularities in the roadway without unduly transmitting the effect thereof to the load or body 13. Spring 58 opposes upward movement of the body 13 relative to the housing 41 and wheel 14, but does so yieldingly and takes care of and compensates for the undesirable effects of rebound due to irregularities in the roadbed.

The spring 64 (Figures 4 and 1) is initially tensioned as by adjustment of the nut 41e to cause the friction washer 62 to interpose sufficient resistance to oscillation of the wheel 14 about the axis of the post 40 when the body 13 carries no load and thus under no load conditions the dependable "following" of the wheel 14 and freedom of oscillation thereof are assured.

However, the friction washer 62 is positioned so that the load carried by the wheel 14 is transmitted substantially through the washer 62 itself and thus I achieve an increased frictional effect as the load in the body 13 increases and thus throughout the varying load conditions met with in practice I achieve a commensurate control of the wheel 14 against the above-mentioned oscillation.

The pulling or pushing of the trailer irrespective of whether the latter is attached to the front or rear bumper of the automobile or other vehicle is, moreover, dependably achieved, due in part to the yieldability of the bumpers 12, through which the tractive effort either pulling or pushing is transmitted to the trailer and its load. This yieldability of the bumpers 12 and hence of the connection between the vehicle and the trailer is of peculiar advantage in achieving reversals of the fork or trunnion 39 with its wheel 14, such reversals taking place when the direction of travel of the vehicle 10 and hence of the trailer 13 is reversed. Thus, for example, referring to Figures 1 and 2, should the vehicle 10 be driven backwardly or to the left, as viewed in these figures, the yieldability of the bumpers 12 permits a sufficient swinging movement in a lateral direction of the trailer 13 to take place to permit the wheel 14 with its trunnion 39 to assume quickly and without undue lateral strain a reversed following position.

The connection of the trailer 13 to the automobile 10 is, moreover, such that as the latter is turned throughout any angle (as in steering the vehicle or in making turns or in turning it around) the trailer, due to the connections formed by the brackets 19 and 20, partakes of the same angular movements as the vehicle 10 itself; in achieving this action the yieldability of the bumpers 12 which thus form part of the connection of the trailer to the automobile is of great advantage, particularly when the trailer carries a substantial load, in that undue or undesired twisting strains of the chassis with respect to the wheels and axles of the automobile are prevented, and the control of the driven vehicle, such as the automobile, is thus made more facile and more dependable. During such a turning movement the bumper 12, referring to Figure 2, can, for example, yield in a direction away from the automobile 19, and may yield in the reverse direction at the other bracket, as at the bracket 20.

In preferably utilizing only a single wheel 14, though it is to be understood that certain features of my invention may be achieved where more than one wheel constructed and mounted as is the wheel 14, are used, I achieve the practical advantage of having the body 13 and any load carried thereon suspended or carried at substantially three points, namely, at the points of attachment of the trailer to the vehicle, as at the brackets 19 and 20, and at the bracket 53 to which the wheel 14 is connected by the mechanism hereinbefore described in detail. Greater ease and readiness of accommodation to irregularities in the roadbed and greater simplicity and less expensiveness of construction are thus made possible. Moreover, the tubular frame member 18 has great resistance to torsional strains, that is, strains tending to twist the member 18 about its axis, and the member 18 coacts with such parts as the cross-braces 15, 16 and 17 to prevent distortion of the body 13 even though the load in the latter may be unsymmetrically placed or non-uniformly distributed.

The bracket 57 (see Figure 4) is preferably so positioned by means of the bolts 55 which may be selectively positioned in any suitable pair of the openings 54, all with respect to the height of the ball members 27 carried by the bumper 12, that the links 42—43 and 44—45 are at such an angle that the body 13 of the trailer is substantially horizontal; such a relation of the parts is shown in Figure 1, it being understood that sufficient allowance may be made, if desired, for a suitable degree of compression of the spring 59, due to the load which the body 13 is intended to carry. Should the trailer 13 be desired to be attached to another vehicle, the bumpers 12 of which are of a different height or to which the ball and bracket members 27—33 (see Figure 5) have to be positioned at a different height, the bracket 57 is correspondingly raised or lowered to give the above-mentioned link members such an angularity (illustratively shown in Figure 1) that the body 13 is maintained at the desired horizontal. The adjustability of the legs 68—69 permits the latter to be accommodated to such varying conditions of practical use. These features are of particular importance in practice due, for example, to the facts that the bumpers to which I, as above noted, preferably attach the trailer may be per se of different styles or constructions, and hence may be of different heights or may be of different heights due to inherent differences in the type or style of automobile or other vehicle to which the trailer is to be attached.

It will thus be seen that there has been provided in this invention a construction in which the objects hereinbefore noted, as well as many thoroughly practical advantages, are successfully achieved. It will be seen that the trailer construction is inexpensive, rugged and well adapted to meet the varying conditions of hard practical use, and that it may be easily and conveniently manipulated and is of thoroughly reliable and dependable action in use.

As many possible embodiments may be made of the above invention, and as many changes might be made in the embodiment above set forth, it is to be understood that all matter hereinbefore set forth or shown in the accompanying drawings is to be interpreted as illustrative and not in a limiting sense.

I claim:

1. In construction of the character described, in combination, a vehicle body or frame adapted to be attached at one end to another vehicle, means at the other end of the vehicle for supporting a wheel, said supporting means being adapted to permit said wheel to pivot about a substantially vertical axis, a pair of vertically spaced substantially parallel links for attaching said wheel-supporting means to said vehicle body, an arm secured to said body and extending substantially between said parallel links, and spring means interposed between said arm and one of said links and said arm and the other of said links.

2. In construction of the character described, in combination, a vehicle body or frame adapted to be attached at one end to another vehicle, means at the other end of the vehicle for supporting a wheel, said supporting means being adapted to permit said wheel to pivot about a substantially vertical axis, a pair of vertically spaced substantially parallel links for attaching said wheel-supporting means to said vehicle body, an arm secured to said body and extending substantially between said parallel links, spring means interposed between said arm and one of said links and said arm and the other of said links, and means for predetermining the vertical displacement of the spring-engaging portions of said arm relative to said vehicle body.

3. In construction of the character described, in combination, a vehicle body or frame adapted to be attached at one end to another vehicle, means at the other end of the vehicle for supporting a wheel, said supporting means being adapted to permit said wheel to pivot about a substantially vertical axis, a pair of vertically spaced substantially parallel links for attaching said wheel-supporting means to said vehicle body, an arm secured to said body and extending substantially between said parallel links, spring means interposed between said arm and one of said links and said arm and the other of said links, and means mounting said arm on said body adapted to permit vertical adjustment of said arm relative to said links.

4. In construction of the character described, in combination, a vehicle body or frame adapted to be attached at one end to another vehicle, means at the other end of the vehicle for supporting a wheel, said supporting means being adapted to permit said wheel to pivot about a substantially vertical axis, and means securing said wheel supporting means to said body and adapted to permit adjustment of said supporting means in a vertical direction relative to the body.

5. In construction of the character described, in combination, a vehicle body or frame adapted to be attached at one end to another vehicle, means at the other end of the vehicle for supporting a wheel, said supporting means being adapted to permit said wheel to pivot about a substantially vertical axis, and means for compensating for different heights above ground to which said one end may be attached to another vehicle, said means including a pair of parallel links connecting said wheel-supporting means to said body together with means for changing at will the angularity of said links relative to said body.

6. In construction of the character described, in combination, a vehicle body or frame adapted to be attached at one end to another vehicle, means at the other end of the vehicle for supporting a wheel, means including a pair of parallel links for securing said wheel-supporting means to said body, rigid means projecting from said body and spaced vertically from one of said links, and yielding means acting between said one link and said rigid projecting means.

7. In construction of the character described, in combination, a vehicle body or frame adapted to be attached at one end to another vehicle, means at the other end of the vehicle for supporting a wheel, and means for compensating for different heights above ground to which said one end may be attached to another vehicle, said means including a pair of parallel links for securing said wheel-supporting means to said body together with means for predetermining at will the angularity of said links relative to said body.

8. In construction of the character described, in combination, a vehicle body or frame adapted to be attached at one end to another vehicle, means at the other end of the vehicle for supporting a wheel, said supporting means being adapted to permit said wheel to pivot about a substantially vertical axis, means for restraining swinging of said wheel-mounting means about said vertical axis, and means responsive to the load carried by said body for increasing the effect of said last-mentioned means.

9. In construction of the character described, in combination, a vehicle body or frame adapted at one end to be secured to another vehicle and provided with at least one wheel at the other end thereof, means mounting said wheel and adapted to permit free swinging thereof about a substantially vertical axis, and means for restraining movement of said mounting means about said vertical axis, said restraining means being positioned to be affected by the load transmitted from said body to said wheel.

10. In construction of the character described, in combination, a vehicle body or frame adapted at one end to be secured to another vehicle and provided with at least one wheel at the other end thereof, means mounting said wheel and adapted to permit free swinging thereof about a substantially vertical axis, spring-controlled means for frictionally restraining said wheel from swinging about said vertical axis, and means responsive to a function of the load carried by said body for changing the effect of said restraining means.

11. In construction of the character described, in combination, a vehicle body or frame adapted at one end to be secured to another vehicle and provided with at least one wheel at the other end thereof, a trunnion for rotatably supporting said wheel, said trunnion having a substantially vertically extending post, means secured to said body and providing a bearing for said post, with respect to which said post and trunnion freely swing, and friction means interposed between said bearing means and said trunnion and positioned so that the load on said bearing means is transmitted therethrough to said trunnion.

12. In construction of the character described, in combination, a vehicle body or frame adapted at one end to be secured to another vehicle and provided with at least one wheel at the other end thereof, a trunnion for rotatably supporting said wheel, said trunnion having a substantially vertically extending post with respect to which said post and trunnion freely swing, means secured to said body and providing a bearing for said post, friction means interposed between said bearing means and said trunnion so that the load on the former is transmitted therethrough to the latter, and means for predetermining the effect of said friction means.

13. In construction of the character described, in combination, a vehicle body or frame adapted at one end to be secured to another vehicle and provided with at least one wheel at the other end thereof, a trunnion for rotatably supporting said wheel, said trunnion having a substantially vertically extending post, means secured to said body and providing a bearing for said post with respect to which said post and trunnion freely swing, friction means interposed between said bearing means and said trunnion so that the load on the former is transmitted therethrough to the latter, and spring means acting upon said friction means.

14. In construction of the character described, in combination, a vehicle body or frame having at least one wheel at one end thereof and provided with means at the other end thereof adapted to permit attachment thereof to another vehicle, a support pivotally secured to said body and adapted to be swung into body-supporting position or into inoperative position, and spring means for holding said support in either of said positions.

15. In construction of the character described, in combination, a vehicle body or frame having at least one wheel at one end thereof and provided with a pair of supports pivotally secured thereto at a point adjacent the center of mass of said body, and spring means acting on each of said supports and adapted to hold the latter either in body-supporting position or in inoperative position.

16. In construction of the character described, in combination, a vehicle body and frame therefor, said frame including two cross-beams one at each end of said body and a longitudinally extending and substantially central tubular member rigidly connected to said cross-beams, said cross-beams and body extending laterally to each side of said tubular member, a single wheel for supporting one end of said body, means rotatably supporting said wheel and secured to one of said cross-beams, and two laterally displaced means secured to the cross-beam at the other end of said body and adapted to connect the latter to another vehicle.

17. In construction of the character described, in combination, a vehicle body and frame therefor, said frame including two cross-beams one at each end of said body and a longitudinally extending and substantially central tubular member rigidly connected to said cross-beams, said cross-beams and body extending laterally to each side of said tubular member, wheel means for supporting one end of said body and means adapted to support the other end of said body, one of said means engaging said frame at a substantially central point thereof and the other of said means engaging said frame at two laterally displaced points thereof.

18. In construction of the character described, in combination, a vehicle body and frame therefor, said frame including two cross-beams one at each end of said body and a longitudinally extending and substantially central tubular member rigidly connected to said cross-beams, said cross-beams and body extending laterally to each side of said tubular member, wheel means for supporting one end of said body and connecting means adapted to attach the other end of said body to another vehicle, one of said means being connected to said frame adjacent the connection of said tubular member to one of said cross-beams and the other of said means engaging the other cross-beam at two substantially laterally displaced points thereof.

19. In construction of the character described, in combination, a vehicle body or frame adapted to be attached at one end to another vehicle, means at the other end of the vehicle for supporting a wheel, said supporting means being adapted to permit said wheel to pivot about a substantially vertical axis, a pair of vertically spaced substantially parallel links for attaching said wheel-supporting means to said vehicle body, and means including a rigid device projecting from said body for limiting the up and down movement of said links.

20. In construction of the character described, in combination, a vehicle body or frame adapted to be attached at one end to another vehicle, means at the other end of the vehicle for supporting a wheel, said supporting means being adapted to permit said wheel to pivot about a substantially vertical axis, means securing said wheel supporting means to said body and adapted to permit adjustment of said supporting means in a vertical direction relative to the body, a pair of supports attached to said body and adapted to be moved into body-supporting position, and means for predetermining at will the effective length of said supports.

21. In construction of the character described, in combination, a vehicle body, a single wheel for supporting one end of said body at a point substantially intermediate of the sides of said body, wheel-supporting means adapted to permit said wheel to pivot about a substantially vertical axis spaced horizontally from the axis of rotation of said wheel, two laterally displaced means at the other end of said body and adapted to support the latter, and structural steel means constructed to resist torsion and having said wheel-supporting means connected therewith at one end and having said two laterally displaced means connected thereto at the other end thereof.

22. In construction of the character described, in combination, a vehicle body, a single wheel for supporting one end of said body at a point substantially intermediate of the sides of said body, wheel-supporting means adapted to permit said wheel to pivot about a substantially vertical axis spaced horizontally from the axis of rotation of said wheel, two laterally displaced means at the other end of said body and adapted to connect the latter to another vehicle, and a tubular member extending lengthwise of said body and having said wheel-supporting means rigidly connected thereto at one end and said two laterally displaced means rigidly connected thereto at its other end.

23. In construction of the character described, in combination, a vehicle body or frame adapted to be attached at one end to another vehicle, means at the other end of the vehicle for supporting a wheel, said supporting means being adapted to permit said wheel to pivot about a substantially vertical axis, a pair of vertically spaced substantially parallel links for attaching said wheel-supporting means to said vehicle body, a rigid member extending from said vehicle body in between said vertically spaced links, spring means interposed between a link and said rigid member, and means securing said rigid member to said body adapted to permit vertical adjustment thereof relative to said links.

24. In construction of the character described, in combination, a vehicle body or frame provided at one end with at least one wheel and adapted to be secured at its other end to another vehicle; and means securing the other end of said body to another vehicle, said means including a pair of ball and socket members, one of which is secured to said body and the other of which is secured to one of two plate-like clamping members, one of said plate-like members being adapted to embrace one side of a part of said vehicle and the other of said plate-like members embracing the other side of said part of said vehicle, and means for causing said clamping members to clamp said part of said vehicle therebetween.

In testimony whereof, I have signed my name to this specification this 14th day of August, 1928.

HOLMAN H. LINN.

said means including a pair of ball and socket members, one of which is secured to said body and the other of which is secured to one of two plate-like clamping members, one of said plate-like members being adapted to embrace one side of a part of said vehicle and the other of said plate-like members embracing the other side of said part of said vehicle, and means for causing said clamping members to clamp said part of said vehicle therebetween.

In testimony whereof, I have signed my name to this specification this 14th day of August, 1928.

HOLMAN H. LINN.

CERTIFICATE OF CORRECTION.

Patent No. 1,794,630.   Granted March 3, 1931, to

HOLMAN H. LINN.

It is hereby certified that error appears in the printed specification of the above numbered patent requiring correction as follows: Page 7, line 35, claim 8, after "pivot" insert the word freely; same page, lines 88 and 89, claim 12, strike out the phrase "with respect to which said post and trunnion freely swing" and insert the same to follow after the word "post" and before the comma in line 91; and that the said Letters Patent should be read with these corrections therein that the same may conform to the record of the case in the Patent Office.

Signed and sealed this 2nd day of June, A. D. 1931.

(Seal)

M. J. Moore,
Acting Commissioner of Patents.

CERTIFICATE OF CORRECTION.

Patent No. 1,794,630.  Granted March 3, 1931, to

HOLMAN H. LINN.

It is hereby certified that error appears in the printed specification of the above numbered patent requiring correction as follows: Page 7, line 35, claim 8, after "pivot" insert the word freely; same page, lines 88 and 89, claim 12, strike out the phrase "with respect to which said post and trunnion freely swing" and insert the same to follow after the word "post" and before the comma in line 91; and that the said Letters Patent should be read with these corrections therein that the same may conform to the record of the case in the Patent Office.

Signed and sealed this 2nd day of June, A. D. 1931.

(Seal)

M. J. Moore,
Acting Commissioner of Patents.